(12) United States Patent
Chae et al.

(10) Patent No.: US 12,236,558 B2
(45) Date of Patent: *Feb. 25, 2025

(54) DEVICE AND METHOD FOR SYNTHESIZING IMAGE CAPABLE OF IMPROVING IMAGE QUALITY

(71) Applicant: DEEPBRAIN AI INC., Seoul (KR)

(72) Inventors: Gyeong Su Chae, Seoul (KR); Guem Buel Hwang, Seoul (KR)

(73) Assignee: DEEPBRAIN AI INC., Seoul (KR)

( * ) Notice: Subject to any disclaimer, the term of this patent is extended or adjusted under 35 U.S.C. 154(b) by 404 days.

This patent is subject to a terminal disclaimer.

(21) Appl. No.: 17/763,941

(22) PCT Filed: Jun. 8, 2021

(86) PCT No.: PCT/KR2021/007145
§ 371 (c)(1),
(2) Date: Mar. 25, 2022

(87) PCT Pub. No.: WO2022/169036
PCT Pub. Date: Aug. 11, 2022

(65) Prior Publication Data
US 2023/0177664 A1    Jun. 8, 2023

(30) Foreign Application Priority Data
Feb. 2, 2021    (KR) .................. 10-2021-0014560

(51) Int. Cl.
*G06T 5/50*    (2006.01)
*G06T 5/00*    (2024.01)
(Continued)

(52) U.S. Cl.
CPC .................. *G06T 5/50* (2013.01); *G06T 5/00* (2013.01); *G06V 10/7715* (2022.01);
(Continued)

(58) Field of Classification Search
CPC .................. G06T 5/50; G06T 5/00; G06T 2207/10016; G06T 2207/20081; G06T 2207/20084;
(Continued)

(56) References Cited

U.S. PATENT DOCUMENTS 10,803,646 B1    10/2020  Bogan, III et al.
2015/0030237 A1   1/2015  Jancsary et al.
(Continued)

FOREIGN PATENT DOCUMENTS

CN    111292265 A      6/2020
CN    111401272 A  *  7/2020  ......... G06K 9/00268
(Continued)

OTHER PUBLICATIONS

Hufei Yu et. al. "A Practical Generative Adversarial Network Architecture for Restoring Damaged Character Photographs, Jan. 2021 , Neurocomputing, vol. 423, pp. 590-600" (Year: 2021).*
Lingyun Yu et. al. "Mining Audio, Text and Visual Information for Talking Face Generation, Nov. 2019, 2019 IEEE International Conference on Data Mining" (Year: 2019).*
(Continued)

*Primary Examiner* — Umair Ahsan
(74) *Attorney, Agent, or Firm* — The PL Law Group, PLLC

(57) ABSTRACT

An image synthesis device according to a disclosed embodiment has one or more processors and a memory which stores one or more programs executed by the one or more processors. The image synthesis device includes a first artificial neural network provided to learn each of a first task of using a damaged image as an input to output a restored image and a second task of using an original image as an input to output a reconstructed image, and a second artificial neural network connected to an output layer of the first artificial neural network, and trained to use the reconstructed image output from the first artificial neural network as an input and improve the image quality of the reconstructed image.

10 Claims, 8 Drawing Sheets

(51) Int. Cl.
*G06V 10/77* (2022.01)
*G06V 10/774* (2022.01)
*G06V 10/82* (2022.01)
*G10L 15/16* (2006.01)
*G10L 15/22* (2006.01)
*G10L 25/57* (2013.01)

(52) U.S. Cl.
CPC ............ *G06V 10/774* (2022.01); *G06V 10/82* (2022.01); *G10L 15/16* (2013.01); *G10L 15/22* (2013.01); *G10L 25/57* (2013.01); *G06T 2207/10016* (2013.01); *G06T 2207/20081* (2013.01); *G06T 2207/20084* (2013.01); *G06T 2207/20212* (2013.01); *G06T 2207/30196* (2013.01)

(58) Field of Classification Search
CPC ........... G06T 2207/20212; G06T 2207/30196; G06T 5/60; G06T 5/77; G06V 10/7715; G06V 10/774; G06V 10/82; G10L 15/16; G10L 15/22; G10L 25/57; G10L 2021/105; G06N 3/04; G06N 3/08; G06N 3/045

See application file for complete search history.

(56) References Cited

U.S. PATENT DOCUMENTS

| | | | |
|---|---|---|---|
| 2023/0177663 A1* | 6/2023 | Chae | G06N 3/08 382/157 |
| 2023/0178095 A1* | 6/2023 | Hwang | G06N 3/04 345/473 |

FOREIGN PATENT DOCUMENTS

| | | |
|---|---|---|
| KR | 10-2020-0044667 A | 4/2020 |
| KR | 10-2020-0107742 A | 9/2020 |
| KR | 10-2154424 B1 | 9/2020 |

OTHER PUBLICATIONS

Office action issued on May 20, 2024 from Korean Patent Office in a counterpart Korean Patent Application No. 10-2021-0014560 (English translation is also submitted herewith.).

Jiancheng Cai et al., "FCSR-GAN: End-to-end Learning for Joint Face Completion and Super-resolution", FG 2019.

Dan Zeng et al., "Talking Face Generation with Expression-Tailored Generative Adversarial Network", 28th ACM International Conference on Multimedia, 2020, pp. 1716-1724.

* cited by examiner

DEVICE AND METHOD FOR SYNTHESIZING IMAGE CAPABLE OF IMPROVING IMAGE QUALITY

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/007145, filed Jun. 8, 2021, which claims priority to the benefit of Korean Patent Application No. 10-2021-0014560 filed in the Korean Intellectual Property Office on Feb. 2, 2021, the entire contents of which are incorporated herein by reference.

BACKGROUND

1. Technical Field

Embodiments of the present invention relate to an image synthesis technology.

2. Background Art

In general, image restoration synthesis means restoring and then outputting a damaged or removed portion of an input image. For example, when there is a portion removed from an image, image restoration synthesis may allow the removed portion to be inferred and restored by looking at the surrounding shape of the removed portion of the image.

In addition, image restoration synthesis means deforming and then outputting one portion of an input image. For example, image restoration synthesis may allow facial expression, body posture, or the like of an image to be deformed by adjusting a parameter.

In an image synthesis model such as image restoration synthesis (i.e., a machine learning model for image synthesis), training may be performed by using an image in which a particular portion is removed from an original image (e.g., an image in which a portion associated with an utterance is removed from an original image in the case of lip sync image synthesis) as an input, comparing an image output from the image synthesis model with the original image to calculate a loss function, and then backpropagating the same.

However, in a machine learning model for image synthesis, due to constraints such as input information input to the machine learning models and complexity of the machine learning model, it is difficult to obtain a synthesis image which is the same as an original image presented as the correct answer when the machine learning model is trained, and it is difficult to obtain a synthesis image in which details of the original image are well preserved. As a result, a portion having a detailed structure or texture in the original image is reproduced unclear or blurry, so that the definition of the synthesis image is degraded.

For example, when a person utters in an image, even when the pronunciation is the same, the person may open the mouth wider or smaller depending on the degree of raising the head or the speed of speech, but there may not be a significant difference in voice signals according to the utterance. At this time, when a portion associated with an utterance of the corresponding person is synthesized on the basis of a voice signal in a machine learning model, training is performed to synthesize an average mouth shape of the corresponding pronunciation, ignoring the difference with the mouth shape and the like shown in an original image.

In this case, when the original image and the synthesis image are compared for the calculation of a loss function in a training process, there are small and large differences in the portion associated with the utterance between the original image and the synthesis image. As a result, it becomes difficult for the machine learning model to learn a detailed portion (e.g., fine wrinkles around the lip and the mouth, beard marks around the mouth, etc.) which may be accurately compared only when the corresponding position in an image is correct.

As another example, when the posture of a person in an original image is deformed into another form and synthesized through a machine learning model, there is a problem in that it is difficult for the machine learning model to accurately synthesize portions such as the texture or complex pattern of the surface of the corresponding person's clothes, such as a suit or a tie.

Therefore, various types of super resolution models are being developed to increase the resolution and definition of an image. However, a typical super resolution models can obtain a desired result when there is a difference only in the resolution between an input image (i.e., a low-resolution image) and an output image (i.e., a high-resolution image) of training data.

That is, when there is a difference in the shape of any object between the input image and the output image, training with respect to the shape difference is simultaneously performed with resolution restoration in a resolution restoration model. Therefore, when an original image and a synthesis image of an image synthesis model are respectively used as an input image and an output image, and applied to the resolution restoration model, a problem in which unintended shape deformation occurs or definition is not sufficiently improved may occur.

SUMMARY

Embodiments of the present invention is to provide a device and a method for synthesizing an image, the device and the method being capable of improving image quality while minimizing the difference with an original image.

An image synthesis device according to a disclosed embodiment is an image synthesis device having one or more processors and a memory which stores one or more programs executed by the one or more processors, and the device includes a first artificial neural network provided to learn each of a first task of using a damaged image as an input to output a restored image and a second task of using an original image as an input to output a reconstructed image, and a second artificial neural network connected to an output layer of the first artificial neural network, and trained to use the reconstructed image output from the first artificial neural network as an input and improve the image quality of the reconstructed image.

During the learning of the first task, the restored image output from the first artificial neural network may bypass the second artificial neural network, and during the learning of the second task, the reconstructed image output from the first artificial neural network may be input to the second artificial neural network.

The damaged image may be an image in which a portion of the original image is damaged, deformed, or removed, and the image quality may include one or more of the definition and resolution of an image, and when the restored image is input from the first artificial neural network, the second artificial neural network may improve the image quality of the restored image and output the restored image with improved image quality.

In the first artificial neural network, an objective function $L_{synth}$ for learning the first task may be represented by Equation 1 below, and in the first artificial neural network, an objective function $L_{recon}$ for learning the second task may be represented by Equation 2 below.

$$L_{synth} = \|X - \hat{X}_{synth}\| \quad \text{(Equation 1)}$$

X: Original image $\hat{X}_{synth}$: Restored image output from first artificial neural network $\|X - \hat{X}_{synth}\|$: Function for obtaining difference between X and $\hat{X}_{synth}$ $$L_{recon} = \|X - \hat{X}_{recon}\| \quad \text{(Equation 2)}$$

$\hat{X}_{recon}$: Reconstructed image output from first artificial neural network $\|X - \hat{X}_{recon}\|$: Function for obtaining difference between X and $\hat{X}_{recon}$ An objective function $L_{synth\text{-}recon}$ of the first artificial neural network for learning both the first task and the second task may be represented by Equation 3 below.

$$L_{synth\text{-}recon} = L_{synth} + \lambda L_{recon} \quad \text{(Equation 3)}$$

$\lambda$: Weight between objective function $L_{synth}$ for learning first task and objective function $L_{recon}$ for learning second task An objective function $L_{sr}$ of the second artificial neural network may be represented by Equation 4 below.

$$L_{sr} = \|X - \hat{X}_{sr}\| \quad \text{(Equation 4)}$$

$\hat{X}_{sr}$: Image output from second artificial neural network

The first artificial neural network may include a first encoder which uses a damaged image or an original image as an input to extract a first image feature vector or a second image feature vector, respectively, and a first decoder which uses the first image feature vector or the second image feature vector as an input to output a restored image or a reconstructed image, respectively, and the second artificial neural network may include a second encoder which is connected to the first decoder, and uses the restored image or the reconstructed image output from the first decoder as an input to output a third image feature vector or a fourth image feature vector, respectively, and a second decoder which uses the third image feature vector or the fourth image feature vector as an input to output the restored image or the reconstructed image with improved image quality, respectively.

The first artificial neural network may be trained to use a person background image and an utterance audio signal as an input to output a lip sync image during the learning of the first task, and trained to use an original utterance image as an input to output a reconstructed image during the learning of the second task, wherein the person background image may be a video portion of the original utterance image in which a portion associated with an utterance is covered by a mask, and the utterance audio signal may be an audio portion of the original utterance image in the same time section as the person background image.

An image synthesis device according to another disclosed embodiment is an image synthesis device having one or more processors and a memory which stores one or more programs executed by the one or more processors, and the device includes a first artificial neural network provided to learn each of a first task of using a damaged image as an input to output a restored image and a second task of using an original image as an input to output a reconstructed image, and a second artificial neural network trained to use the reconstructed image according to the second task as an input and improve the image quality of the reconstructed image, wherein the second artificial neural network is inserted between neural network layers constituting the first artificial neural network.

The first artificial neural network may include an encoder which uses a damaged image or an original image as an input to extract a first image feature vector or a second image feature vector, respectively, and a decoder which uses the first image feature vector or the second image feature vector as an input to output a restored image or a reconstructed image, respectively, wherein the second artificial neural network may be inserted between neural network layers constituting the decoder.

A method for synthesizing an image according to a disclosed embodiment is a method performed in a computing device having one or more processors and a memory which stores one or more programs executed by the one or more processors, the method including, in a first artificial neural network, learning a first task of using a damaged image as an input to output a restored image, in the first artificial neural network, learning a second task of using an original image as an input to output a reconstructed image, and in a second artificial neural network connected to an output layer of the first artificial neural network, learning to use the reconstructed image output from the first artificial neural network as an input and improve the image quality of the reconstructed image.

According to a disclosed embodiment, in a first artificial neural network model, training is performed to perform both a first task of using a damaged image as an input to output a restored image and a second task of using an original image as an input to output a reconstructed image, and in a second artificial neural network model, training is performed to improve the image quality of the reconstructed image, which is a product of the second task, so that it is possible to input the restored image, which is a product of the first task of the first artificial neural network model, to the second artificial neural network model to improve image quality. At this time, in the second artificial neural network model, training is performed by using the reconstructed image, which is a product of the second task, as an input, so that it is possible to minimize the shape deformation of an object in an image while improving image quality.

DETAILED DESCRIPTION

Hereinafter, specific embodiments of the present invention will be described with reference to the accompanying drawings. The following detailed description is provided to assist in a comprehensive understanding of the methods, devices and/or systems described herein. However, the detailed description is only illustrative, and the present invention is not limited thereto.

In describing embodiments of the present invention, when a specific description of known technology associated with the present invention is deemed to make the gist of the present invention unnecessarily vague, the detailed description thereof will be omitted. The terms used below are defined in consideration of functions in the present invention, but may vary in accordance with the customary practice or the intention of a user or an operator. Therefore, the terms should be defined based on whole content throughout the present specification. The terms used herein are only for describing the embodiments of the present invention, and should not be construed as limited. A singular expression includes a plural meaning unless clearly used otherwise. In the present description, expressions such as "include" or "have" are for referring to certain characteristics, numbers, steps, operations, components, and some or combinations thereof, and should not be construed as excluding the presence or possibility of one or more other characteristics, numbers, steps, operations, components, and some or combinations thereof besides those described.

In the following description, the terms "transmission," "communication," and "reception" of a signal or information and other similar terms may include a meaning in which the signal or information is directly transmitted from one element to another element and transmitted from one element to another element through an intervening element. In particular, "transmission" or "sending" of the signal or information to one element may indicate a final destination of the signal or information and may not imply a direct destination. The same applies to "reception" of the signal or information. In addition, in the present specification, a meaning in which two or more pieces of data or information are "related" indicates that when any one piece of data (or information) is obtained, at least a portion of other data (or information) may be obtained based thereon.

Furthermore, the terms "first," "second," and the like may be used for describing various elements, but the elements should not be construed as being limited by the terms. These terms may be used for distinguishing one element from another element. For example, a first element could be termed a second element and vice versa without departing from the scope of the present invention.

Figure 1:
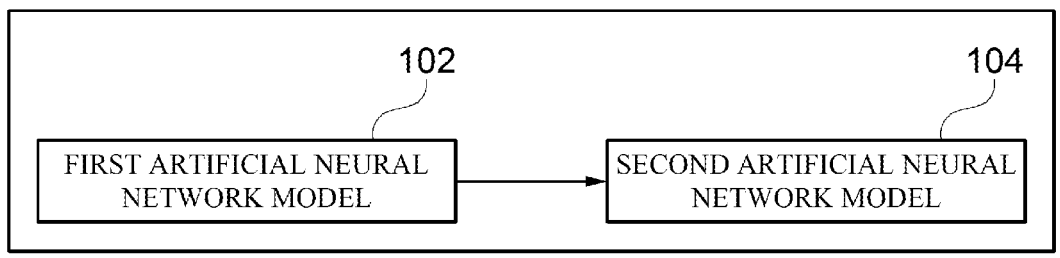
FIG. 1 is a view showing the configuration of an image synthesis device capable of improving image quality according to an embodiment of the present invention.

FIG. 1 is a view showing the configuration of an image synthesis device capable of improving image quality according to an embodiment of the present invention.

Referring to FIG. 1, an image synthesis device 100 may include a first artificial neural network model 102 and a second artificial neural network model 104.

The first artificial neural network model 102 may be a model trained to use a damaged image as an input to output a restored image. Here, the damaged image may be an image in which a portion of an original image is damaged, deformed, or removed. In order to improve the image quality of the restored image, the first artificial neural network model 102 may additionally perform a task of using the original image as an input to output a reconstructed image (i.e., an image in which the original image is reconstructed) other than a task of using the damaged image as an input to output the restored image.

Here, the image quality may include one or more of the definition and resolution of an image. That is, improving the image quality of the restored image may include all of improvement in the definition of the restored image, improvement in the resolution of the restored image, and improvement in the definition and resolution of the restored image.

In the first artificial neural network model 102, the task of using a damaged image as an input to output a restored image may be referred to as a first task, and the task of using an original image as an input to output a reconstructed image may be referred to as a second task. In an example embodiment, the first artificial neural network model 102 may be implemented by a convolutional neural network (CNN)-based machine learning technology, but the machine learning technology is not limited thereto, and other various machine learning technologies may be applied.

The second artificial neural network model 104 may be provided to improve the image quality of the reconstructed image output from the first artificial neural network model 102. That is, the second artificial neural network model 104 may be provided to improve one or more of the definition and resolution of the reconstructed output from the first artificial neural network model 102.

Specifically, the second artificial neural network model 104 may be trained to use the reconstructed image output from the first artificial neural network model 102 as an input to improve the image quality of the reconstructed image. That is, the second artificial neural network model 104 may be trained in conjunction with the second task of the first artificial neural network model 102.

When the second artificial neural network model 104 is trained, when the restored image, which is a product of the first task of the first artificial neural network model 102, is input to the second artificial neural network model 104, the restored image with improved image quality may be obtained through the second artificial neural network model 104. In an example embodiment, the second artificial neural network model 104 may be implemented by a convolutional neural network (CNN)-based machine learning technology, but the machine learning technology is not limited thereto, and other various machine learning technologies may be applied.

Figure 2:
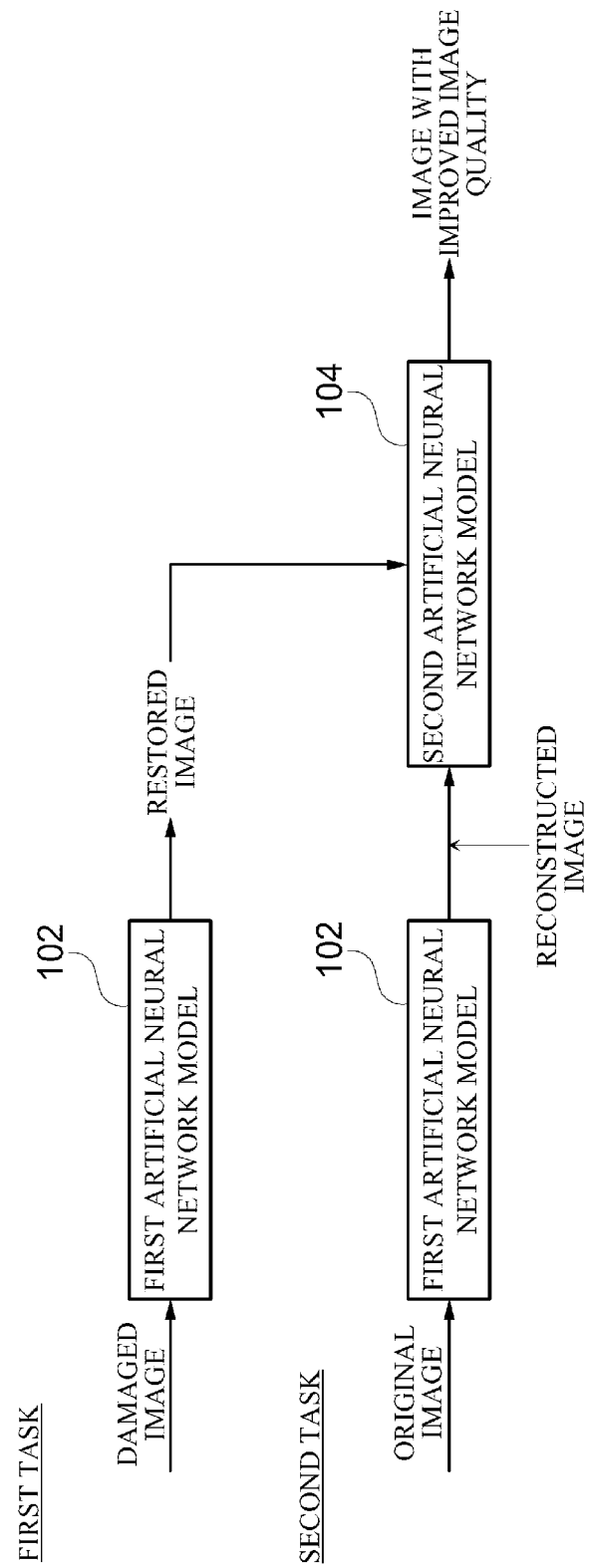
FIG. 2 is a view schematically showing the training process of a first artificial neural network model and a second artificial neural network model in an embodiment of the present invention.

FIG. 2 is a view schematically showing the training process of the first artificial neural network model 102 and the second artificial neural network model 104 in an embodiment of the present invention.

Referring to FIG. 2, the first artificial neural network model 102 may learn the first task to output a restored image using a damaged image as an input. Here, the first artificial neural network model 102 for learning the first task may be represented by Equation 1 below.

$$\hat{X}_{synth} = F(X; \theta) \quad \text{(Equation 1)}$$

$\hat{X}_{synth}$: Restored image output from first artificial neural network model 102

F: Image constituting first artificial neural network model 102

X': Damaged image in which portion of original image X is damaged, deformed, or removed θ: Parameter of neural network F In an example embodiment, the damaged image X' may be an image in which a mask is synthesized in the original image X. Here, the mask may be a binary mask which has the same size as the original image, and in which a damaged pixel (e.g., a pixel damaged, deformed, or removed from an original image) is set to 0, and a normal pixel is set to 1. However, the embodiment of the present invention is not limited thereto, and various types of masks may be used.

At this time, an objective function $L_{synth}$ for learning the first task in the first artificial neural network model 102 may be represented by Equation 2 below.

$$L_{synth} = \|X - \hat{X}_{synth}\| \qquad \text{(Equation 2)}$$

In Equation 2, X is an original image, the $\|A-B\|$ function represents a function for obtaining the difference between A and B (e.g., a function obtaining the Euclidean distance (L2 distance) or the Manhattan distance (L1 distance) of A and B). That is, the first artificial neural network model 102 may be trained to minimize the difference between the original image and the restored image when learning the first task.

In addition, the first artificial neural network model 102 may learn the second task of using an original image as an input to output a reconstructed image. Here, the first artificial neural network model 102 for learning the second task may be represented by Equation 3 below.

$$\hat{X}_{recon} = F(X; \theta) \qquad \text{(Equation 3)}$$

$\hat{X}_{recon}$: Reconstructed image output from first artificial neural network model 102

At this time, an objective function $L_{recon}$ for learning the second task in the first artificial neural network model 102 may be represented by Equation 4 below. That is, the first artificial neural network model 102 may be trained to minimize the difference between the original image and the reconstructed image when learning the second task.

$$L_{recon} = \|X - \hat{X}_{recon}\| \qquad \text{(Equation 4)}$$

The first artificial neural network model 102 performs both the first task and the second task, and an objective function $L_{synth-recon}$ of the first artificial neural network model 102 for performing the first task and the second task may be represented by Equation 5 below.

$$L_{synth-recon} = L_{synth} \lambda L_{recon} \qquad \text{(Equation 5)}$$

λ: Weight between objective function $L_{synth}$ for learning first task and objective function $L_{recon}$ for learning second task In addition, an optimized parameter θ* of the first artificial neural network model 102 for performing the first task and the second task may be represented by Equation 6 below.

$$\theta^* = \operatorname{argmin}_\theta (L_{synth-recon}) \qquad \text{(Equation 1)}$$

Here, $\operatorname{argmin}_\theta$ represents a function that obtains θ for minimizing the $L_{synth-recon}$. That is, according to Equation 5 and Equation 6, the first artificial neural network model 102 may be trained to o minimize the objective function $L_{synth}$ and the objective function $L_{recon}$, simultaneously.

Since the reconstructed image output from the first artificial neural network model 102 according to the training of the second task uses the original image as an input image, the shapes of objects included in the original image are the same as those in the original image. However, since the first task is also trained in the first artificial neural network model 102, there is a constraint in that parameters shared for the first task and the second tasks should be used, and as a result, the reconstructed image is output with image quality similar to that of the restored image. That is, the image quality of a reconstructed image when both the first task and the second task are trained is degraded compared to the image quality of a reconstructed image when only the second task is trained in the first artificial neural network model 102.

Therefore, the reconstructed image output by the first artificial neural network model 102 by learning the second task may be input to the second artificial neural network model 104 to improve the image quality. The second artificial neural network model 104 may be trained to use the reconstructed image output from the first artificial neural network model 102 as an input to improve the image quality of the reconstructed image.

The second artificial neural network model 104 may be trained to improve the image quality of the reconstructed image using a known artificial intelligence-based definition and/or resolution improvement techniques. Here, the second artificial neural network model 104 for improving the image quality of the reconstructed image may be represented by Equation 7 below.

$$\hat{X}_{sr} = G(X_{recon}; \gamma) \qquad \text{(Equation 7)}$$

$\hat{X}_{sr}$: Image output from second artificial neural network model 104

G: Neural network constituting second artificial neural network model 104

γ: Parameter of neural network G

In addition, an objective function $L_{sr}$ of the second artificial neural network model 104 may be represented by Equation 8 below.

$$L_{sr} = \|X - \hat{X}_{sr}\| \qquad \text{(Equation 8)}$$

That is, the second artificial neural network model 104 may be trained to minimize the difference between an image $\hat{X}_{sr}$ output from second artificial neural network model 104 and the original image X. In this case, one or more of the definition and resolution of the image $\hat{X}_{sr}$ output from second artificial neural network model 104 are improved, so that the difference with the original image is minimized.

When the second artificial neural network model 104 is trained as described above, the restored image, which is a product of the first task of the first artificial neural network model 102, may be input to the second artificial neural network model 104. Then, the second artificial neural network model 104 improves one or more of the definition and resolution of the restored image to output the restored image with improved image quality.

According to a disclosed embodiment, in the first artificial neural network model 102, training is performed to perform both a first task of using a damaged image as an input to output a restored image and a second task of using an original image as an input to output a reconstructed image, and in the second artificial neural network model 104, training is performed to improve the image quality of the reconstructed image, which is a product of the second task, so that it is possible to input the restored image, which is a product of the first task of the first artificial neural network model 102, to the second artificial neural network model 104 to improve image quality. At this time, in the second artificial neural network model 104, training is performed by using the reconstructed image, which is a product of the second task, as an input, so that it is possible to minimize the shape deformation of an object in an image while improving image quality.

Figure 3:
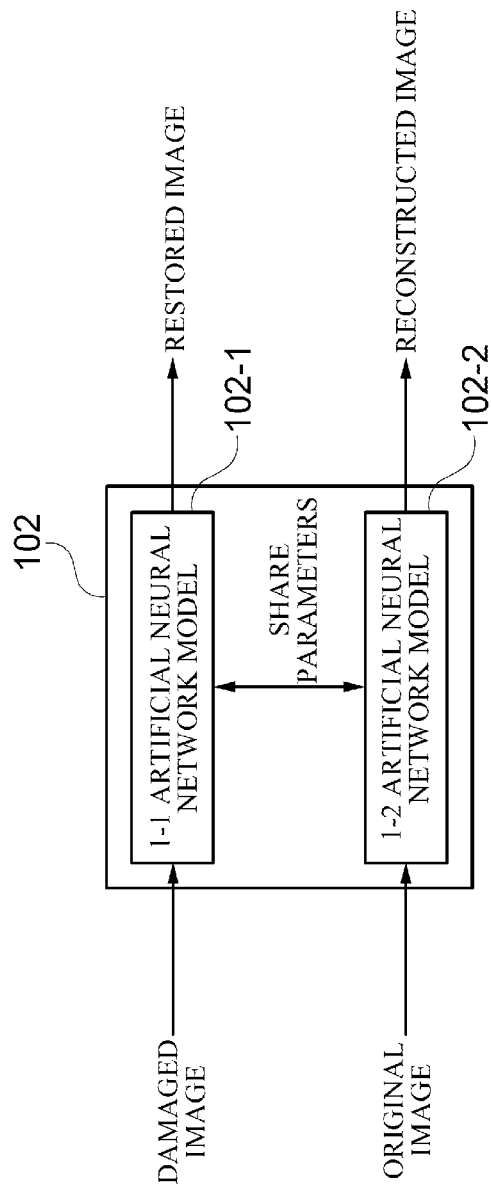
FIG. 3 is a view schematically showing the configuration of a first artificial neural network model in an embodiment of the present invention.

Meanwhile, herein, the first artificial neural network model 102 has been described to perform both the first task and the second task in one artificial neural network model, but is not limited thereto, and as illustrated in FIG. 3, the first artificial neural network model 102 may include a 1-1 artificial neural network model 102-1 and a 1-2 artificial neural network model 102-2.

The 1-1 artificial neural network model 102-1 may be a model for learning a first task of using a damaged image as an input to output a restored image. The 1-2 artificial neural network model 102-2 may be a model for learning a second task of using an original image as an input to output a reconstructed image. Here, the 1-1 artificial neural network model 102-1 and the 1-2 artificial neural network model 102-2 may share neural network parameters with each other.

In addition, herein, the first artificial neural network model 102 and the second artificial neural network model 104 have been described as separate artificial neural network models, but are not limited thereto, and may be implemented as one artificial neural network model. That is, the neural network of the second artificial neural network model 104 may be added to the neural network of the first artificial neural network model 102 to be implemented as one artificial neural network model.

Figure 4:
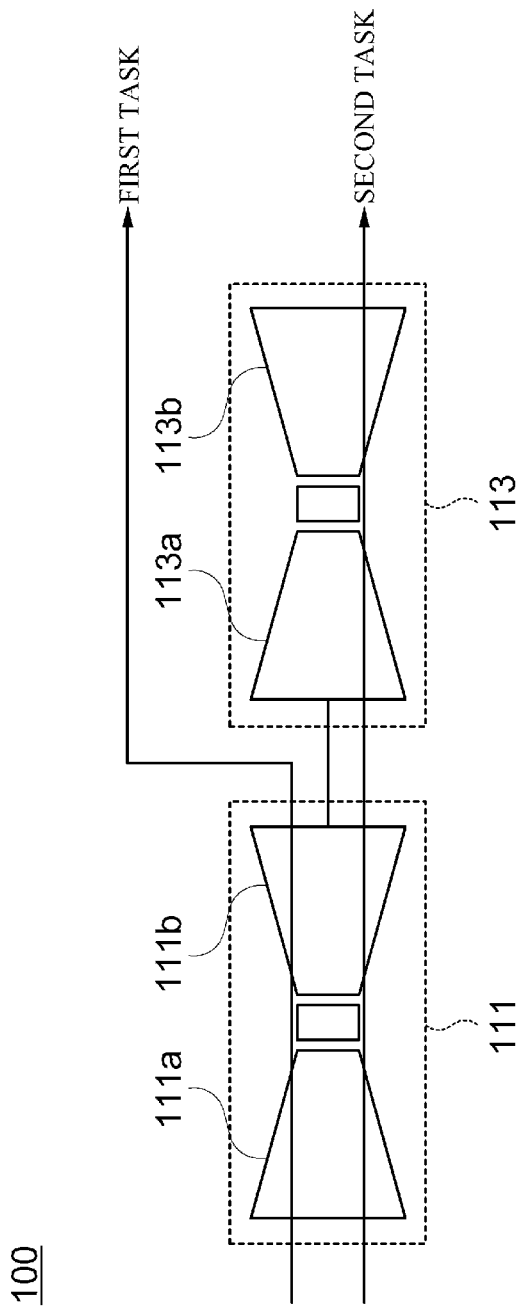
FIG. 4 and FIG. 5 are views schematically showing an embodiment in which an image synthesis device of the present invention is implemented as one artificial neural network model.
Figure 5:
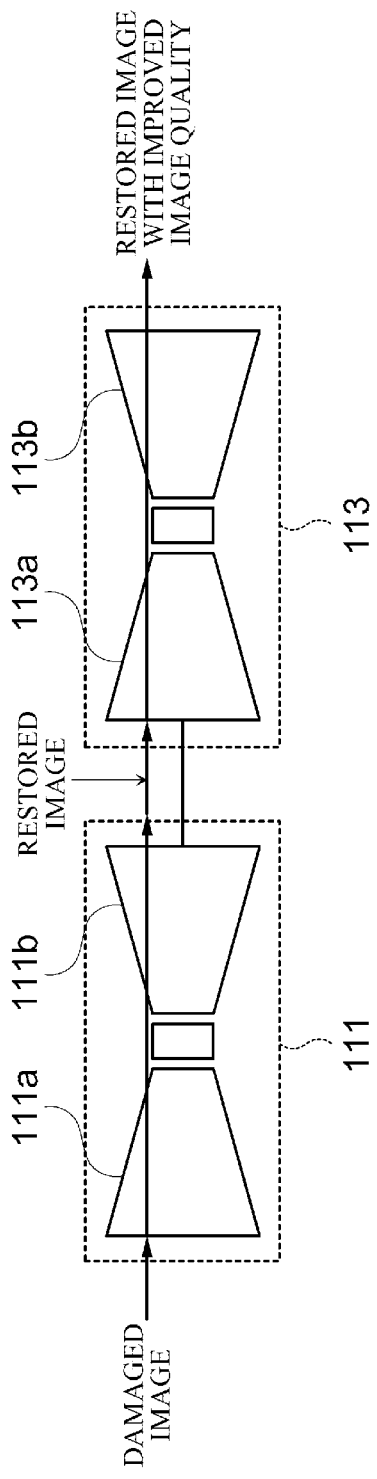

FIG. 4 and FIG. 5 are views schematically showing an embodiment in which the image synthesis device 100 of the present invention is implemented as one artificial neural network model. Referring to FIG. 4, the image synthesis device 100 may include a first artificial neural network 111 and a second artificial neural network 113.

The first artificial neural network 111 may be a neural network for learning the first task of using a damaged image as an input to output a restored image and the second task of using an original image as an input to output a reconstructed image. The first artificial neural network 111 may include a first encoder 111a and a first decoder 111b. The first encoder 111a may use a damaged image or an original image as an input to extract a first image feature vector or a second image feature vector, respectively. The first decoder 111b may use the first image feature vector or the second image feature vector as an input to output a restored image or a reconstructed image, respectively.

The second artificial neural network 113 may be a neural network trained to use the reconstructed image output from the first artificial neural network 111 as an input to improve the image quality of the reconstructed image. The second artificial neural network 113 may be connected to an output layer of the first artificial neural network 111. The second artificial neural network 113 may include a second encoder 113a and a second decoder 113b.

The second encoder 113a may be connected to the first decoder 111b. The second encoder 113a may use the restored image or the reconstructed image output from the first decoder 111b as an input to output a third image feature vector or a fourth image feature vector, respectively. The second decoder 113b may use the third image feature vector or the fourth image feature vector as an input to output the restored image or the reconstructed image with improved image quality, respectively.

In a training process, as illustrated in FIG. 4, a damaged image may be input to the first artificial neural network 111 during learning of the first task to output a restored image. That is, during the learning the first task, it is possible to bypass without using the second artificial neural network 113. During the learning of the second task, an original image may be input to the first artificial neural network 111 to output a reconstructed image, and the output reconstructed image may be input to the second artificial neural network 113 to output an image with improved image quality.

In a prediction process, as illustrated in FIG. 5, a damaged image may be input to the first artificial neural network 111 to output a restored image, and the output restored image may be input to the second artificial neural network 113 to output the restored image with improved image quality.

Here, the second artificial neural network 113 for improving image quality is described as being connected to the output layer of the first artificial neural network 111, but is not limited thereto, and the neural network of the second artificial neural network 113 may be included in the first artificial neural network 111. For example, the neural network of the second artificial neural network 113 may be included in the first decoder 111b of the first artificial neural network 111.

Figure 6:
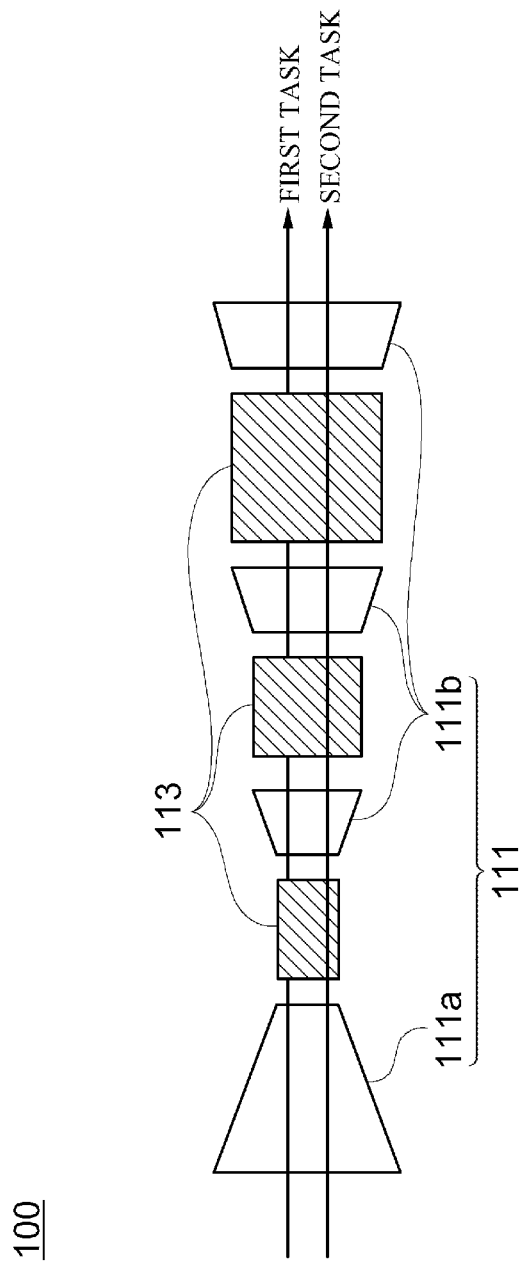
FIG. 6 is a view schematically showing another embodiment in which an image synthesis device of the present invention is implemented as one artificial neural network model.

FIG. 6 is a view schematically showing another embodiment in which the image synthesis device 100 of the present invention is implemented as one artificial neural network model. Referring to FIG. 6, the image synthesis device 100 may include a first artificial neural network 111 and a second artificial neural network 113. Here, the first artificial neural network 111 may include an encoder 111a and a decoder 111b. At this time, the second artificial neural network 113 may be added between neural network layers constituting the decoder 111b. A plurality of the second artificial neural network 113 may be divided and inserted between the neural network layers constituting the decoder 111b.

In the case of learning the first task, a damaged image may be inserted into the encoder 111a to extract a feature, and then restored through only the decoder 113b, bypassing the second artificial neural network 113. In the case of learning the second task, an original image may be inserted into the encoder 111a to extract a feature, and then reconstructed through the neural network constituting the second artificial neural network 113, and the decoder 113b.

Figure 7:
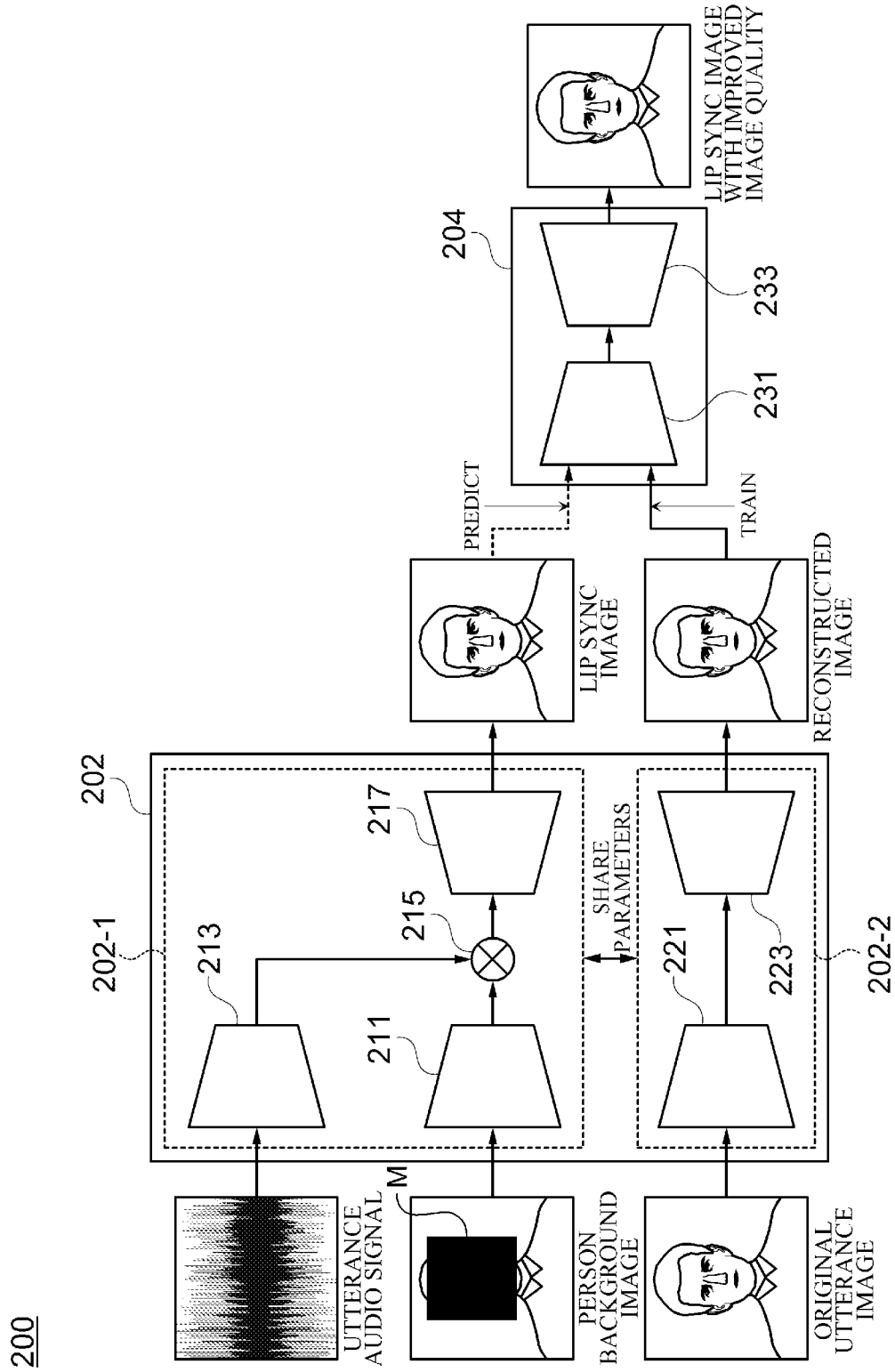
FIG. 7 is a view showing the configuration of an image synthesis device according to another embodiment of the present invention.

FIG. 7 is a view showing the configuration of an image synthesis device according to another embodiment of the present invention. Here, an example is shown in which the image synthesis device synthesizes a lip sync image.

Referring to FIG. 7, an image synthesis device 200 may include a first artificial neural network model 202 and a second artificial neural network model 204. The first artificial neural network model 202 may include a 1-1 artificial neural network model 202-1 and a 1-2 artificial neural network model 202-2.

The 1-1 artificial neural network model 202-1 may be a model for learning a first task of using a person background image as an input to output a lip sync image.

The 1-1 artificial neural network model 202-1 may include a first encoder 211, a second encoder 213, a combiner 215, and a first decoder 217.

The first encoder 211 may be trained to use a person background image as an input to extract an image feature vector. Hereinafter, the term "vector" may also be used to refer to a "tensor."

Here, the person background image input to the first encoder 211 is an image in which a person utters (speaks). The person background image may be an image including a face and upper body of a person. That is, the person background image may be an image including not only the face but also the upper body of a person who utters so as to show movements of the face, neck, shoulder, and the like of the corresponding person, but is not limited thereto, and may be an image including the face of the person.

A portion associated with an utterance in the person background image input to the first encoder 211 may be masked. That is, the portion (e.g., a mouth and portions around the mouth) associated with the utterance in the person background image may be covered by a mask M. In addition, during a masking process, portions associated with facial movement, neck movement, shoulder movement, and the like as a result of the utterance of the person in the person background image may not be masked. Then, the first encoder 211 extracts an image feature vector of a portion excluding the portion associated with the utterance in the person background image.

In an example embodiment, the first encoder 211 may include at least one convolutional layer and at least one pooling layer. The convolutional layer, while moving a filter of a preset size (e.g., 3×3 pixel size) at regular intervals in the input person background image, may extract a feature value of pixels corresponding to the filter. The pooling layer may receive an output from the convolutional layer as an input to perform down sampling.

The second encoder 213 may be trained to use the utterance audio signal as an input to extract a voice feature vector. Here, the utterance audio signal corresponds to an audio portion in the person background image (i.e., an image in which a person utters) input to the first encoder 211. In other words, a video portion in a video in which a person utters may be input to the first encoder 211, and an audio portion may be input to the second encoder 213. The second encoder 213 may include at least one convolutional layer and at least one pooling layer, but a neural network structure of the second encoder 213 is not limited thereto.

The person background image input to the first encoder 211 and the utterance audio signal input to the second encoder 213 may be synchronized in time. That is, in a section of the same time band in a video in which a person utters, video may be input to the first encoder 211, and audio may be input to the second encoder 213. For example, when the person background image is an image for time t from a specific point of time, the utterance audio signal may be a voice for the time t from the same point of time. At this time, the person background image and the utterance audio signal may be input to the first encoder 211 and the second encoder 213 every preset unit time (e.g., one frame or a plurality of successive frames).

The combiner 215 may combine the image feature vector output from the first encoder 211 and the voice feature vector output from the second encoder 213 to generate a combined vector. In an example embodiment, the combiner 215 may concatenate the image feature vector and the voice feature vector to generate a combined vector, but is not limited thereto.

The first decoder 217 may use the combined vector output from the combiner 215 as an input to generate a lip sync image. Specifically, the first decoder 217 may be trained to restore the portion (i.e., the portion associated with the utterance) covered by the mask M of the image feature vector (i.e., a video portion in a video in which a person utters, a feature of a portion in which a portion associated with an utterance is covered by a mask) output from the first encoder 211, on the basis of the voice feature vector (i.e., a feature of an audio portion in the video in which a person utters) output from the second encoder 113.

That is, when a portion associated with an utterance is masked in the person background image, the first decoder 217 may be a model trained to restore the masked region using the utterance audio signal. The first decoder 217 may compare a generated lip sync image with an original utterance image (i.e., a correct value), and may adjust a training parameter (e.g., a loss function, a softmax function, etc.) such that the generated lip sync image approximates the original utterance image (i.e., to minimize the difference with the original utterance image).

The 1-2 artificial neural network model 202-2 may be a model for learning a second task of using an original utterance image as an input to output a reconstructed image. The 1-2 artificial neural network model 202-2 may share neural network parameters with the 1-1 artificial neural network model 202-1. The 1-2 artificial neural network model 202-2 may include a third encoder 221 and a second decoder 223.

The third encoder 221 may be trained to use the original utterance image as an input to extract an image feature vector. Here, the original utterance image may be an image in which the mask M is removed from a person background image. That is, the person background image may be an image in which a portion associated with an utterance in the original utterance image is covered by the mask M.

The second decoder 223 may be trained to output a reconstructed image (i.e., an image in which the original utterance image is reconstructed) on the basis of the image feature vector output from the third encoder 221. The second decoder 223 may adjust a training parameter (e.g., a loss function, a softmax function, etc.) to minimize the difference between the reconstructed image and the original utterance image.

The second artificial neural network model 204 may be a model trained to improve the image quality of a reconstructed image output from the 1-2 artificial neural network model 202-2 and output the reconstructed image with improved image quality. The second artificial neural network model 204 may include a fourth encoder 231 and a third decoder 233.

The fourth encoder 231 may be trained to use the reconstructed image output from the 1-2 artificial neural network model 202-2 as an input to extract an image feature vector. The third decoder 233 may be trained to output a reconstructed image with improved image quality on the basis of the image feature vector output from the fourth encoder 231.

When the second artificial neural network model 204 is trained, a lip sync image output from the 1-1 artificial neural network model 202-1 may be input to the fourth encoder 231. Then, the fourth encoder 231 may extract an image feature vector from the lip sync image. The third decoder 233 may output a lip sync image with improved image quality on the basis of the image feature vector output from the fourth encoder 231.

Figure 8:
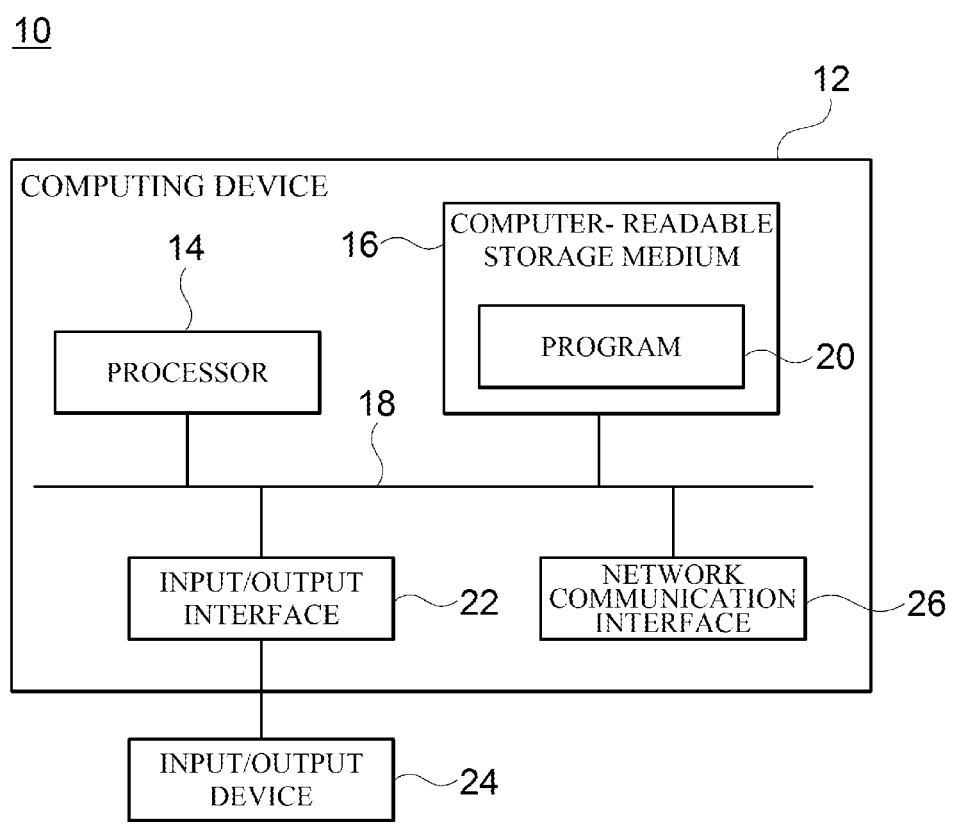
FIG. 8 is a block diagram illustrating a computing environment that includes a computing device suitable for use in example embodiments.

FIG. 8 is a block diagram illustrating a computing environment 10 that includes a computing device suitable for use in example embodiments. In the illustrated embodiment, each component may have different functions and capabilities in addition to those described below, and additional components may be included in addition to those described below.

The illustrated computing environment 10 includes a computing device 12. In an embodiment, the computing device 12 may be the image synthesis device 100 or 200.

The computing device 12 includes at least one processor 14, a computer-readable storage medium 16, and a communication bus 18. The processor 14 may allow the computing device 12 to operate according to the example embodiment mentioned above. For example, the processor 14 may execute one or more programs stored in the computer-readable storage medium 16. The one or more programs may include one or more computer-executable commands, and when executed by the processor 14, the computer-executable command may be configured to allow the computing device 12 to perform operations according to the example embodiment.

The computer-readable storage medium 16 is configured to store computer-executable commands or program codes, program data, and/or other suitable types of information. A program 20 stored in the computer-readable storage medium 16 includes a set of commands executable by the processor 14. In one embodiment, the computer-readable storage medium 16 may be a memory (a volatile memory such as a random access memory, a non-volatile memory, or any suitable combination thereof), one or more magnetic disk storage devices, optical disk storage devices, flash memory devices, other types of storage media accessible by the computing device 12 and capable of storing desired information, or any suitable combination thereof.

The communication bus 18 includes the processor 14 and the computer-readable storage medium 16 to interconnect various other components of the computing device 12.

The computing device 12 may also include one or more input/output interfaces 22 which provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or track pad), a keyboard, a touch input device (such as a touch pad or touch screen), a voice or sound input device, an input device such as various types of sensor devices and/or photographing devices, and/or an output device such as a display device, a printer, a speaker, and/or a network card. The exemplary input/output device 24 may be included inside the computing device 12 as one component constituting the computing device 12, or may be connected to the computing device 12 as a separate device distinct from the computing device 12.

Although the example embodiment of the present invention has been described in detail as above, those skilled in the art to which the present invention pertains will understand that various modifications may be made thereto within the limit that do not depart from the scope of the present invention. Therefore, the scope of rights of the present invention should not be limited to the described embodiments, but should be defined not only by claims set forth below but also by equivalents of the claims.

What is claimed is:

1. An image synthesis device having one or more processors and a memory which stores one or more programs executed by the one or more processors, the device comprising:
a first artificial neural network provided to learn each of a first task of using a damaged image as an input to output a restored image and a second task of using an original image as an input to output a reconstructed image; and
a second artificial neural network connected to an output layer of the first artificial neural network, and trained to use the reconstructed image output from the first artificial neural network as an input and improve the image quality of the reconstructed image,
wherein, in the first artificial neural network, an objective function $L_{synth}$ for learning the first task is represented by Equation 1 below:

$$L_{synth} = \|X - \hat{X}_{synth}\| \quad \text{[Equation 1]}$$

where X: Original image;
$\hat{X}_{synth}$: Restored image output from first artificial neural network;
$\|X - \hat{X}_{synth}\|$: Function for obtaining difference between X and $\hat{X}_{synth}$; and
in the first artificial neural network, an objective function $L_{recon}$ for learning the second task is represented by Equation 2 below:

$$L_{recon} = \|X - \hat{X}_{recon}\| \quad \text{[Equation 2]}$$

where $\hat{X}_{recon}$: Reconstructed image output from first artificial neural network; and
$\|X - \hat{X}_{recon}\|$: Function for obtaining difference between X and $\hat{X}_{recon}$.

2. The image synthesis device of claim 1, wherein, during the learning of the first task, the restored image output from the first artificial neural network bypasses the second artificial neural network; and
during the learning of the second task, the reconstructed image output from the first artificial neural network is input to the second artificial neural network.

3. The image synthesis device of claim 2, wherein the damaged image is an image in which a portion of the original image is damaged, deformed, or removed;
the image quality comprises one or more of the definition and resolution of an image; and
when the restored image is input from the first artificial neural network, the second artificial neural network improves the image quality of the restored image and outputs the restored image with improved image quality.

4. The image synthesis device of claim 1, wherein an objective function $L_{synth-recon}$ of the first artificial neural network for learning both the first task and the second task is represented by Equation 3 below:

$$L_{synth-recon} = L_{synth} + \lambda L_{recon} \quad \text{[Equation 3]}$$

where $\lambda$: Weight between objective function $L_{synth}$ for learning first task and objective function $L_{recon}$ for learning second task.

5. The image synthesis device of claim 1, wherein an objective function $L_{sr}$ of the second artificial neural network is represented by Equation 4 below:

$$L_{sr} = \|X - \hat{X}_{sr}\| \quad \text{[Equation 4)]}$$

where $\hat{X}_{sr}$: Image output from second artificial neural network.

6. The image synthesis device of claim 1, wherein the first artificial neural network comprises:
a first encoder which uses a damaged image or an original image as an input to extract a first image feature vector or a second image feature vector, respectively; and
a first decoder which uses the first image feature vector or the second image feature vector as an input to output a restored image or a reconstructed image, respectively; and
the second artificial neural network comprises:
a second encoder which is connected to the first decoder, and uses the restored image or the reconstructed image output from the first decoder as an input to output a third image feature vector or a fourth image feature vector, respectively; and
a second decoder which uses the third image feature vector or the fourth image feature vector as an input to output the restored image or the reconstructed image with improved image quality, respectively.

7. The image synthesis device of claim 1, wherein the first artificial neural network is:
trained to use a person background image and an utterance audio signal as an input to output a lip sync image during the learning of the first task; and
trained to use an original utterance image as an input to output a reconstructed image during the learning of the second task,
wherein the person background image is a video portion of the original utterance image in which a portion associated with an utterance is covered by a mask; and
the utterance audio signal is an audio portion of the original utterance image in the same time section as the person background image.

8. An image synthesis device having one or more processors and a memory which stores one or more programs executed by the one or more processors, the device comprising:
a first artificial neural network provided to learn each of a first task of using a damaged image as an input to output a restored image and a second task of using an original image as an input to output a reconstructed image; and
a second artificial neural network trained to use the reconstructed image according to the second task as an input and improve the image quality of the reconstructed image, wherein the second artificial neural network is inserted between neural network layers constituting the first artificial neural network,
wherein, in the first artificial neural network, an objective function $L_{synth}$ for learning the first task is represented by Equation 1 below:

$$L_{synth} = \|X - \hat{X}_{synth}\|$$ [Equation 1]

where X: Original image;
$\hat{X}_{synth}$: Restored image output from first artificial neural network;
$\|X - \hat{X}_{synth}\|$: Function for obtaining difference between X and $\hat{X}_{synth}$; and
in the first artificial neural network, an objective function $L_{recon}$ for learning the second task is represented by Equation 2 below:

$$L_{recon} = \|X - \hat{X}_{recon}\|$$ [Equation 2]

where $\hat{X}_{recon}$: Reconstructed image output from first artificial neural network; and
$\|X - \hat{X}_{recon}\|$: Function for obtaining difference between X and $\hat{X}_{recon}$.

9. The image synthesis device of claim 8, wherein the first artificial neural network comprises:
an encoder which uses a damaged image or an original image as an input to extract a first image feature vector or a second image feature vector, respectively; and
a decoder which uses the first image feature vector or the second image feature vector as an input to output a restored image or a reconstructed image, respectively, wherein the second artificial neural network is inserted between neural network layers constituting the decoder.

10. A method for synthesizing an image, which is a method performed in a computing device having one or more processors and a memory which stores one or more programs executed by the one or more processors, the method comprising:
in a first artificial neural network, learning a first task of using a damaged image as an input to output a restored image;
in the first artificial neural network, learning a second task of using an original image as an input to output a reconstructed image; and
in a second artificial neural network connected to an output layer of the first artificial neural network, learning to use the reconstructed image output from the first artificial neural network as an input and improve the image quality of the reconstructed image-,
wherein, in the first artificial neural network, an objective function $L_{synth}$ for learning the first task is represented by Equation 1 below:

$$L_{synth} = \|X - \hat{X}_{synth}\|$$ [Equation 1]

where X: Original image;
$\hat{X}_{synth}$: Restored image output from first artificial neural network;
$\|X - \hat{X}_{synth}\|$: Function for obtaining difference between X and $\hat{X}_{synth}$; and
in the first artificial neural network, an objective function $L_{recon}$ for learning the second task is represented by Equation 2 below:

$$L_{recon} = \|X - \hat{X}_{recon}\|$$ [Equation 2]

where $\hat{X}_{recon}$: Reconstructed image output from first artificial neural network; and
$\|X - \hat{X}_{recon}\|$: Function for obtaining difference between X and $\hat{X}_{recon}$.

* * * * *